(12) United States Patent
Lu et al.

(10) Patent No.: US 11,785,262 B1
(45) Date of Patent: Oct. 10, 2023

(54) DYNAMIC COMPRESSION OF AUDIO-VISUAL DATA

(71) Applicant: International Business Machines Corporation, Armonk, NY (US)

(72) Inventors: Fang Lu, Billerica, MA (US); Jeremy R. Fox, Georgetown, TX (US); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 17/696,428

(22) Filed: Mar. 16, 2022

(51) Int. Cl.
  *H04N 19/87* (2014.01)
  *G06N 3/08* (2023.01)
  *H04N 23/951* (2023.01)

(52) U.S. Cl.
  CPC .............. *H04N 19/87* (2014.11); *G06N 3/08* (2013.01); *H04N 23/951* (2023.01)

(58) Field of Classification Search
  CPC ......... H04N 19/87; H04N 23/951; G06N 3/08
  See application file for complete search history.

(56) References Cited

U.S. PATENT DOCUMENTS

| | | | |
|---|---|---|---|
| 9,313,138 B2 | 4/2016 | Sun | |
| 9,571,827 B2 | 2/2017 | Su | |
| 9,854,017 B2 * | 12/2017 | Gogoi | ............... H04N 21/6547 |
| 10,070,050 B2 | 9/2018 | De Bayser | |
| 10,540,578 B2 | 1/2020 | Madani | |
| 10,628,931 B1 | 4/2020 | Ramos | |
| 10,687,122 B2 | 6/2020 | Schmidmer | |

(Continued)

FOREIGN PATENT DOCUMENTS

| | | |
|---|---|---|
| CN | 111091151 A | 5/2020 |
| CN | 111885384 A | 11/2020 |

(Continued)

OTHER PUBLICATIONS

Brownlee, "A Gentle Introduction to Generative Adversarial Networks (GANS)", Jun. 17, 2019, machinelearningmastery.com, 17 pps., <https://machinelearningmastery.com/what-are-generative-adversarial-networks-gans/>.

(Continued)

*Primary Examiner* — Minh Chau Nguyen
(74) *Attorney, Agent, or Firm* — Grant Johnson

(57) ABSTRACT

Disclosed are techniques for dynamic compression of audio-visual data, including a method for reducing a size of media content, comprising identifying a scene to be captured by a capture device, wherein the scene comprises a plurality of objects, and determining whether at least one of: (i) an available storage in the capture device to store a digital media file associated with the scene; and (ii) an available network bandwidth to transfer the digital media file is below an associated threshold. In response to the threshold determination, some embodiments may further comprise analyzing the plurality of objects to determine which objects can be redeveloped by a GAN regeneration module to a threshold quality level and which objects cannot be redeveloped with the GAN regeneration module to the threshold quality level, generating an optimized capture plan based on the analyzing, and encoding the scene pursuant to the optimized capture plan.

20 Claims, 9 Drawing Sheets

(56) References Cited

U.S. PATENT DOCUMENTS

| | | | |
|---|---|---|---|
| 11,568,646 B2* | 1/2023 | Haro | G06T 19/003 |
| 2018/0075581 A1 | 3/2018 | Shi | |
| 2018/0336479 A1* | 11/2018 | Guttmann | G06V 10/764 |
| 2020/0280730 A1 | 9/2020 | Wang | |
| 2021/0042882 A1 | 2/2021 | Kim | |
| 2021/0397126 A1* | 12/2021 | Hornstein | G06F 3/012 |
| 2022/0277565 A1* | 9/2022 | Haro | G06V 40/174 |

FOREIGN PATENT DOCUMENTS

| | | |
|---|---|---|
| CN | 112492313 B | 3/2021 |
| WO | 2020251523 A1 | 12/2020 |

OTHER PUBLICATIONS

Lei, Generative Adversarial Network technology: AI goes mainstream, ibm.com, Sep. 17, 2019, 3 pps., <https://www.ibm.com/blogs/systems/generative-adversarial-network-technology-ai-goes-mainstream/#>.

Mell et al., "The NIST Definition of Cloud Computing", National Institute of Standards and Technology, U.S. Department of Commerce, NIST Special Publication 800-145, Sep. 2011, 7 pages.

"Edge Computing Solutions—IBM 5G and edge computing", IBM, downloaded from the Internet on Feb. 20, 2023, 24 pages.

\* cited by examiner

DYNAMIC COMPRESSION OF AUDIO-VISUAL DATA

BACKGROUND

The present disclosure relates to digital compression methods, and more specifically, to dynamic setting amelioration via a network bandwidth and storage space aware, generative adversarial network (GAN).

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the relatively higher performance of those capabilities, resulting in computer systems today that are more powerful than just a few years ago.

These advances have caused network bandwidth and storage to become significant limiting factors. For example, cameras may be used for capturing visual physical surroundings. Feeds from these cameras may be used for various purpose, like industrial monitoring, robotic vision, quality control, etc. The clarity of the captured photograph (images) and/or video is often important for image analysis. Unfortunately, creating clearer images and/or video typically requires encoding more information using more digital bits. Transferring and saving those digital bits, in turn, may consume considerable network bandwidth and/or storage space.

SUMMARY

According to embodiments of the present disclosure, a method for reducing a size of media content, comprising identifying a scene to be captured by a capture device, wherein the scene comprises a plurality of objects. The method may further comprise determining whether at least one of: (i) an available storage in the capture device to store a digital media file associated with the scene; and (ii) an available network bandwidth to transfer the digital media file is below an associated threshold. In response to the threshold determination, some embodiments may further comprise analyzing the plurality of objects to determine which objects can be redeveloped by a GAN regeneration module to a threshold quality level and which objects cannot be redeveloped with the GAN regeneration module to the threshold quality level, generating an optimized capture plan based on the analyzing, and encoding the scene pursuant to the optimized capture plan to produce the digital media file. In some embodiments, encoding the scene may comprise capturing the objects that can be redeveloped by the GAN regeneration module at a lower resolution than the objects that cannot be redeveloped. In some embodiments, encoding the scene may comprise capturing the objects that can be redeveloped at a lower frame rate than the objects that cannot be redeveloped. In some embodiments, the generating of the optimized capture plan may comprise using a historical quality evaluation of GAN enabled image redevelopments to determine which objects can be redeveloped to the threshold quality level. Some embodiments may further comprise redeveloping the digital media file to a higher quality level by the GAN regeneration module. Some embodiments may further comprise calculating an estimated time to redevelop the digital media file to the higher quality level by the GAN regeneration module, and if the estimated time is greater than a threshold, increasing the threshold quality level. Some embodiments may further comprise, in response to determining that an amount of local storage on the capture device is below a threshold, analyzing a plurality of existing stored digital media files in a storage system, analyzing a plurality of objects in the existing stored digital media files to identify which objects in the stored digital media files can be redeveloped by the GAN regeneration module to the threshold quality level and which objects in the stored digital media files cannot be redeveloped with the GAN regeneration module to the threshold quality level, and reducing a quality level of the objects that can be redeveloped by the GAN regeneration module.

A further aspect provides a computer program for implementing the method.

A further aspect provides a corresponding computer program product.

A further aspect provides a system for implementing the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
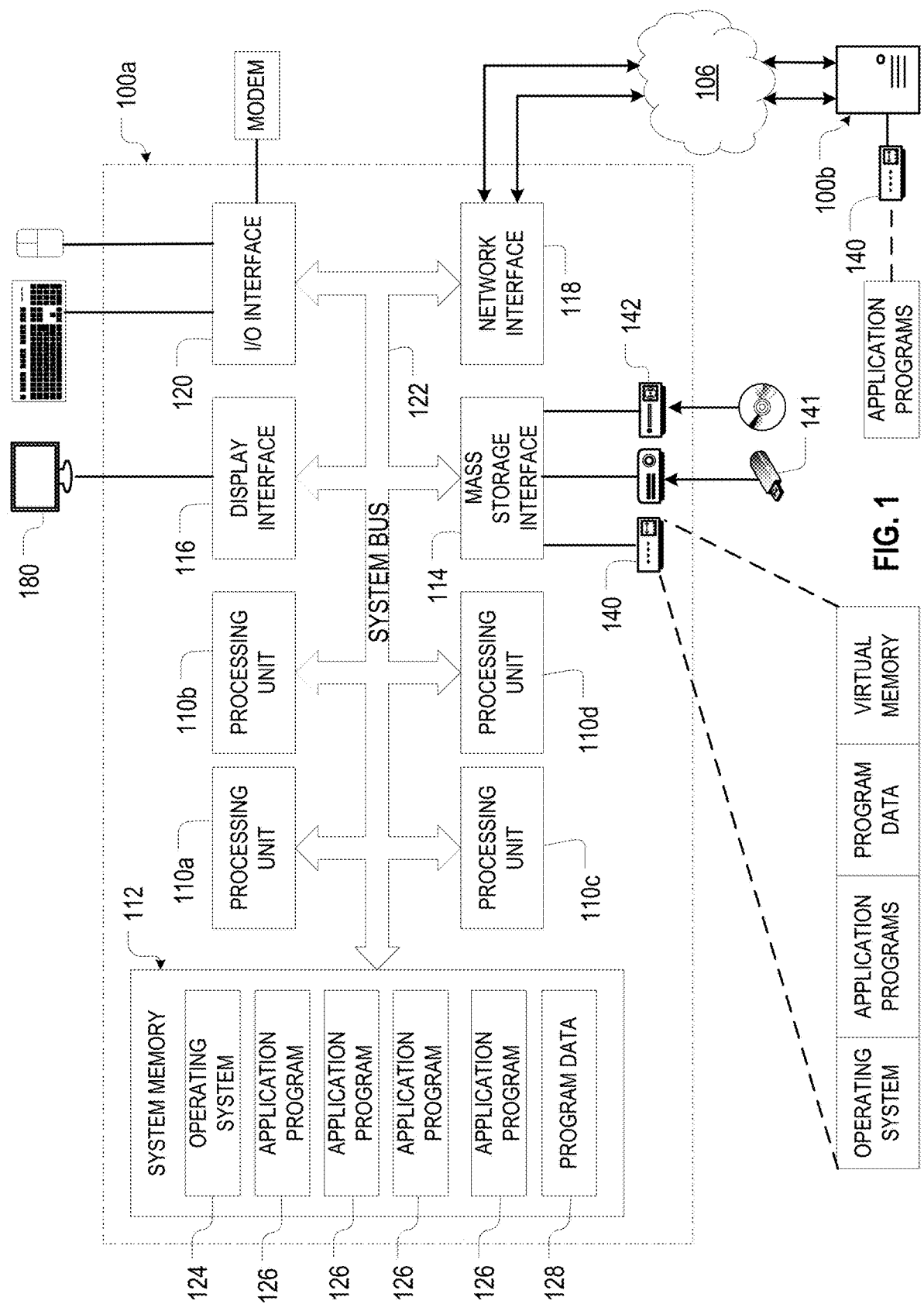
FIG. 1 illustrates one embodiment of a data processing system (DPS), consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to digital compression methods; more particular aspects relate to dynamic amelioration via a network bandwidth and storage space aware, generative adversarial network (GAN). While the present disclosure is not necessarily limited to such applications, various aspects of the disclosure may be appreciated through a discussion of various examples using this context.

A capture device may be any electronic device that can encode audiovisual data, such as still images (e.g., pictures), video, and/or audio. For example, the image capture device may be a standalone camera (e.g., a digital camera), a tablet, a smartphone, or a tablet computer. However, embodiments of the present disclosure are not limited to these examples. Thus, the terms "camera" and "capture device" may be used interchangeably herein.

Cameras may encode and store the encoded audiovisual data in their local storage (i.e., within the device), or may transfer the captured audiovisual data to a remote server through a network. In either case, the higher resolution at which the data is encoded, the more disk space (i.e., storage) and/or bandwidth will typically be required. In some cases, the required bandwidth may exceed the amount available. Similarly, higher-resolution media may require more time to transfer in such bandwidth-limited environments.

Accordingly, some embodiments of this disclosure may include a network bandwidth and storage space aware camera with dynamic setting amelioration. Some embodiments may include one or more generative adversarial networks (GANs). Generative modeling, in turn, generally refers to a type of unsupervised learning task that involves one or more artificial intelligence (AI) models that automatically discover and learn the regularities or patterns in input data in such a way that the AI model(s) can be used to generate new examples that plausibly could have been drawn from the original dataset. A GAN is a type of generative modeling in which two AI models compete with each other to become more accurate in their predictions. GANs typically run unsupervised and may use a cooperative zero-sum game framework.

The GAN in some embodiments may comprise a generator AI model and a discriminator AI model. The output/objective of the generator AI model may be the creation of a fake output. The generator AI model may take random noise as input, and it may produce output similar to what would be produced by a real camera capturing real people and/or real places. The discriminator AI model, in turn, may act as an approver/rejector of the images produced by the generator AI model. The discriminator AI model may be trained with real images so that it has a good ability to identify those real images.

In operation, the real and the fake images (i.e., generated by the generator AI model) may be fed to the discriminator AI model. Initially, the discriminator AI model should not have significant problems in distinguishing the real images from the fake images. The output from the discriminator, however, may be used to further train the generator AI model. Guided by this feedback, the generator AI model modifies its approach, with the goal of producing a more authentic output in its next iteration. Over time, the generator AI model becomes better and better, and eventually it reaches an equilibrium where the discriminator AI model can no longer reliably distinguish the generated (i.e., fake) images from the real images.

After the GAN has been trained, the GAN may be used in some embodiments to create/recreate relatively higher-resolution images from smaller and/or lower resolution images. Some embodiments may use a super high-resolution GAN (SRGAN) that has been trained to upscale photos while maintaining their sharpness. These embodiments may add new data to the input images based on the patterns learned during the training process. This additional data may allow relatively sharper, more detailed photos for a predetermined maximum file size.

Accordingly, one feature and advantage of some embodiments is GAN-enabled consolation via visual objection recognition. In these embodiments, while capturing media content (e.g., photograph or video), a GAN enabled optimizer may recognize a plurality of objects to be captured by the capture device, and then may determine which of those objects can be redeveloped clearly and reliably with a GAN enabled regeneration module and which objects cannot be properly redeveloped with the GAN regeneration module. Based on this determination, some embodiments may dynamically determine how the photograph and/or video is to be best captured such that the resulting media content storage file can be kept under a predetermined maximum.

Another feature and advantage of some embodiments is available storage and/or bandwidth transfer validation. These embodiments may initially determine an amount of available storage in the local device to store the media, a current amount of network bandwidth available (e.g., if the media content is transferred through network), and/or a current amount of storage available on a remote digital media storage system. Based on these determination(s), some embodiments may dynamically determine whether or not the GAN enabled optimizer is to be enabled, as well as an amount of media content to be dynamically downgraded, for optimum capture of the media contents with any determined size and/or bandwidth constraints.

Another feature and advantage of some embodiments is partial photograph GAN decision processing. Based at least in part on a historical quality evaluation of GAN enabled image object developments and corrections, some embodiments may identify which object(s) in the photo and/or video can be developed to a specified threshold quality level and which cannot be developed with the specified threshold quality level. Some of these embodiments may dynamically determine which object(s) needs lower resolution and which object(s) needs higher resolution based at least in part on the identification.

Another feature and advantage of some embodiments is that the capturing device may identify limited storage and/or bandwidth. In response, based on the determined capability of the GAN regeneration module, the camera may dynamically identify an optimal frame rate to which the captured video (or portions thereof) may be captured and/or reduced. For example, in one application, the camera may be capable of capturing video at 20 frames of images of video per second, but may remove (or not capture) some of those frames so that it may achieve a final frame rate of about 5-10 frames per second. The lost frames may be later redeveloped with the GAN regeneration model in some embodiments.

Another feature and advantage of some embodiments is GAN enabled decision processing for capturing requirements. In some embodiments, if the camera needs additional storage space to store new video and/or image contents, then the GAN optimizer module may perform analysis of the existing stored media contents and may automatically lower the resolution of the already-captured media contents. Later, those media contents may be later corrected with GAN regeneration model. In this way, these embodiments may dynamically enable creation of additional storage space on the local or remote storage. Additionally, the storage space may be dynamically re-optimized through time e.g., a picture may be analyzed and stored at a first quality level, then later reanalyzed and stored at a lower quality level. In some embodiments, this optimization/re-optimization process may also be performed in response to a user indicating that he or she wishes to free up storage space for future use.

Another feature and advantage of some embodiments is determining an extended reach of GAN usage. Based at least in part on an estimated time required for media content to be redeveloped with the GAN regeneration module and a specified time at which the user wishes to consume the media content, the system may dynamically determine how much of the digital media can be redeveloped with the GAN regeneration module, and thus, an optimal pixel density at which the image and/or video can be captured. For example, if the user wishes to consume the media ten minutes after capture, some embodiments may determine that three frames per second can be redeveloped by the GAN regeneration module in those ten minutes, and then use that calculated information to dynamically determine an optimized video capture plan.

Data Processing System (DPS)

FIG. 1 illustrates one embodiment of a data processing system (DPS) 100a, 100b (herein generically referred to as a DPS 100), consistent with some embodiments. FIG. 1 only depicts the representative major components of the DPS 100, and those individual components may have greater complexity than represented in FIG. 1. In some embodiments, the DPS 100 may be implemented as a personal computer; server computer; portable computer, such as a laptop or notebook computer, PDA (Personal Digital Assistant), tablet computer, or smartphone; processors embedded into larger devices, such as an automobile, airplane, teleconferencing system, appliance; smart devices; or any other appropriate type of electronic device. Moreover, components other than or in addition to those shown in FIG. 1 may be present, and the number, type, and configuration of such components may vary.

The DPS 100 in FIG. 1 may comprise a plurality of processing units 110a-110d (generically, processor 110 or CPU 110) that may be connected to a main memory 112, a mass storage interface 114, a terminal/display interface 116, a network interface 118, and an input/output ("I/O") interface 120 by a system bus 122. The mass storage interface 114 in this embodiment may connect the system bus 122 to one or more mass storage devices, such as a direct access storage device 140, a USB drive 141, and/or a readable/writable optical disk drive 142. The network interface 118 may allow the DPS 100a to communicate with other DPS 100b over a network 106. The main memory 112 may contain an operating system 124, a plurality of application programs 126, and program data 128.

The DPS 100 embodiment in FIG. 1 may be a general-purpose computing device. In these embodiments, the processors 110 may be any device capable of executing program instructions stored in the main memory 112, and may themselves be constructed from one or more microprocessors and/or integrated circuits. In some embodiments, the DPS 100 may contain multiple processors and/or processing cores, as is typical of larger, more capable computer systems; however, in other embodiments, the DPS 100 may only comprise a single processor system and/or a single processor designed to emulate a multiprocessor system. Further, the processor(s) 110 may be implemented using a number of heterogeneous data processing systems in which a main processor 110 is present with secondary processors on a single chip. As another illustrative example, the processor(s) 110 may be a symmetric multiprocessor system containing multiple processors 110 of the same type.

When the DPS 100 starts up, the associated processor(s) 110 may initially execute program instructions that make up the operating system 124. The operating system 124, in turn, may manage the physical and logical resources of the DPS 100. These resources may include the main memory 112, the mass storage interface 114, the terminal/display interface 116, the network interface 118, and the system bus 122. As with the processor(s) 110, some DPS 100 embodiments may utilize multiple system interfaces 114, 116, 118, 120, and buses 122, which in turn, may each include their own separate, fully programmed microprocessors.

Instructions for the operating system 124 and/or application programs 126 (generically, "program code," "computer usable program code," or "computer readable program code") may be initially located in the mass storage devices, which are in communication with the processor(s) 110 through the system bus 122. The program code in the different embodiments may be embodied on different physical or tangible computer-readable media, such as the memory 112 or the mass storage devices. In the illustrative example in FIG. 1, the instructions may be stored in a functional form of persistent storage on the direct access storage device 140. These instructions may then be loaded into the main memory 112 for execution by the processor(s) 110. However, the program code may also be located in a functional form on the computer-readable media, such as the direct access storage device 140 or the readable/writable optical disk drive 142, that is selectively removable in some embodiments. It may be loaded onto or transferred to the DPS 100 for execution by the processor(s) 110.

With continuing reference to FIG. 1, the system bus 122 may be any device that facilitates communication between and among the processor(s) 110; the main memory 112; and the interface(s) 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The main memory 112 and the mass storage device(s) 140 may work cooperatively to store the operating system 124, the application programs 126, and the program data 128. In some embodiments, the main memory 112 may be a random-access semiconductor memory device ("RAM") capable of storing data and program instructions. Although FIG. 1 conceptually depicts the main memory 112 as a single monolithic entity, the main memory 112 in some embodiments may be a more complex arrangement, such as a hierarchy of caches and other memory devices. For example, the main memory 112 may exist in multiple levels of caches, and these caches may be further divided by function, such that one cache holds instructions while another cache holds non-instruction data that is used by the processor(s) 110. The main memory 112 may be further distributed and associated with a different processor(s) 110 or sets of the processor(s) 110, as is known in any of various so-called non-uniform memory access (NUMA) computer architectures. Moreover, some embodiments may utilize virtual addressing mechanisms that allow the DPS 100 to behave as if it has access to a large, single storage entity instead of access to multiple, smaller storage entities (such as the main memory 112 and the mass storage device 140).

Although the operating system 124, the application programs 126, and the program data 128 are illustrated in FIG. 1 as being contained within the main memory 112 of DPS 100a, some or all of them may be physically located on a different computer system (e.g., DPS 100b) and may be accessed remotely, e.g., via the network 106, in some embodiments. Moreover, the operating system 124, the application programs 126, and the program data 128 are not necessarily all completely contained in the same physical DPS 100a at the same time, and may even reside in the physical or virtual memory of other DPS 100b.

The system interfaces 114, 116, 118, 120 in some embodiments may support communication with a variety of storage and I/O devices. The mass storage interface 114 may support the attachment of one or more mass storage devices 140, which may include rotating magnetic disk drive storage devices, solid-state storage devices (SSD) that uses integrated circuit assemblies as memory to store data persistently, typically using flash memory or a combination of the two. Additionally, the mass storage devices 140 may also comprise other devices and assemblies, including arrays of disk drives configured to appear as a single large storage device to a host (commonly called RAID arrays) and/or archival storage media, such as hard disk drives, tape (e.g., mini-DV), writable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like. The I/O interface 120 may support attachment of one or more I/O devices, such as a keyboard, mouse, modem, or printer (not shown)

The terminal/display interface 116 may be used to directly connect one or more displays 180 to the DPS 100. These displays 180 may be non-intelligent (i.e., dumb) terminals, such as an LED monitor, or may themselves be fully programmable workstations that allow IT administrators and users to communicate with the DPS 100. Note, however, that while the display interface 116 may be provided to support communication with one or more displays 180, the DPS 100 does not necessarily require a display 180 because all needed interaction with users and other processes may occur via the network 106.

The network 106 may be any suitable network or combination of networks and may support any appropriate protocol suitable for communication of data and/or code to/from multiple DPS 100. Accordingly, the network interfaces 118 may be any device that facilitates such communication, regardless of whether the network connection is made using present-day analog and/or digital techniques or via some networking mechanism of the future. Suitable networks 106 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols may be used to implement the network 106. The Transmission Control Protocol/Internet Protocol ("TCP/IP") suite contains a suitable network and transport protocols.

Cloud Computing

Figure 2:
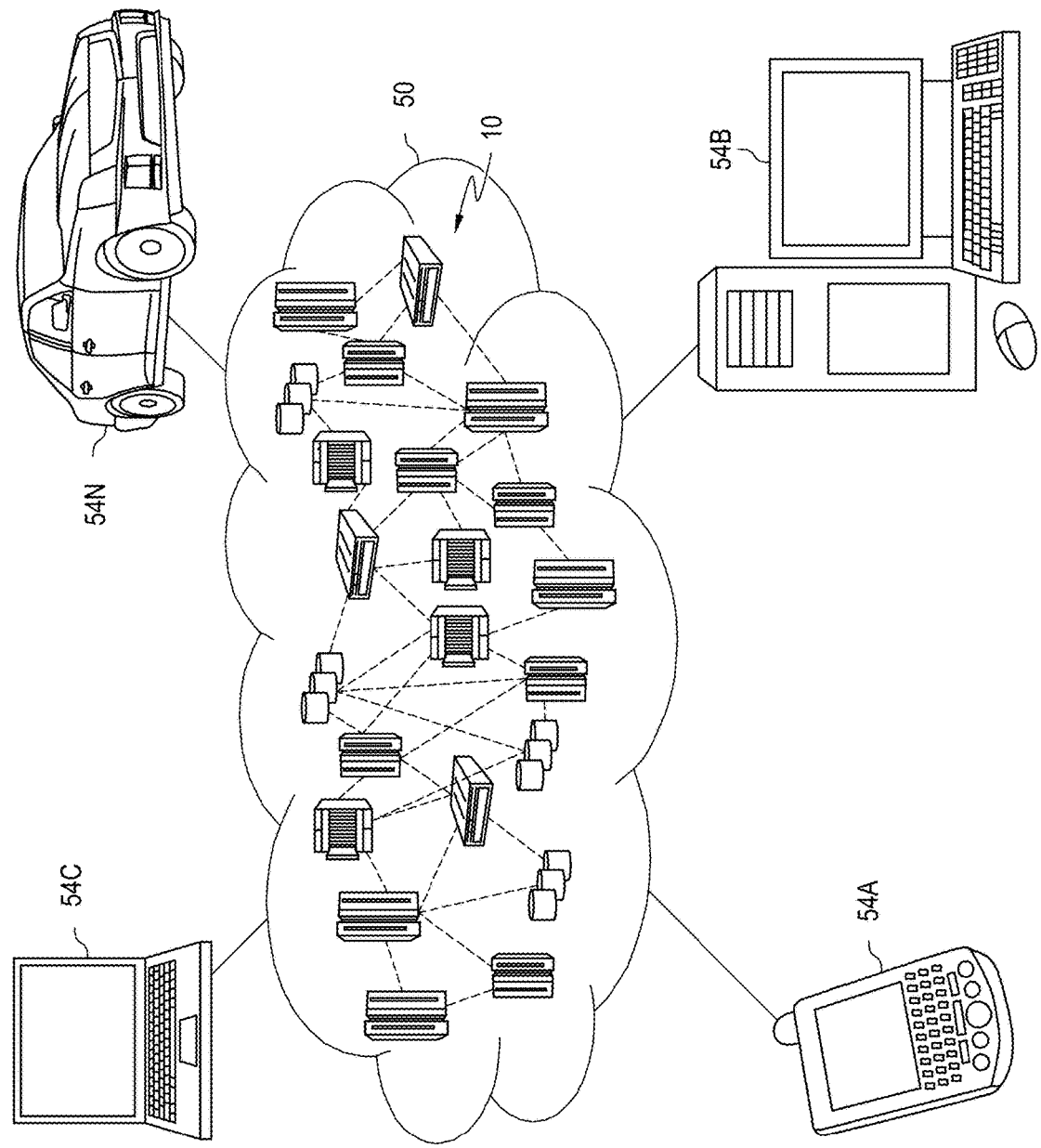
FIG. 2 illustrates one embodiment of a cloud environment suitable for enabling a confidentiality-based intelligent task routing service mesh, consistent with some embodiments.

FIG. 2 illustrates one embodiment of a cloud environment suitable for enabling a digital media storage system using one or more DPS, such as DPS 100. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
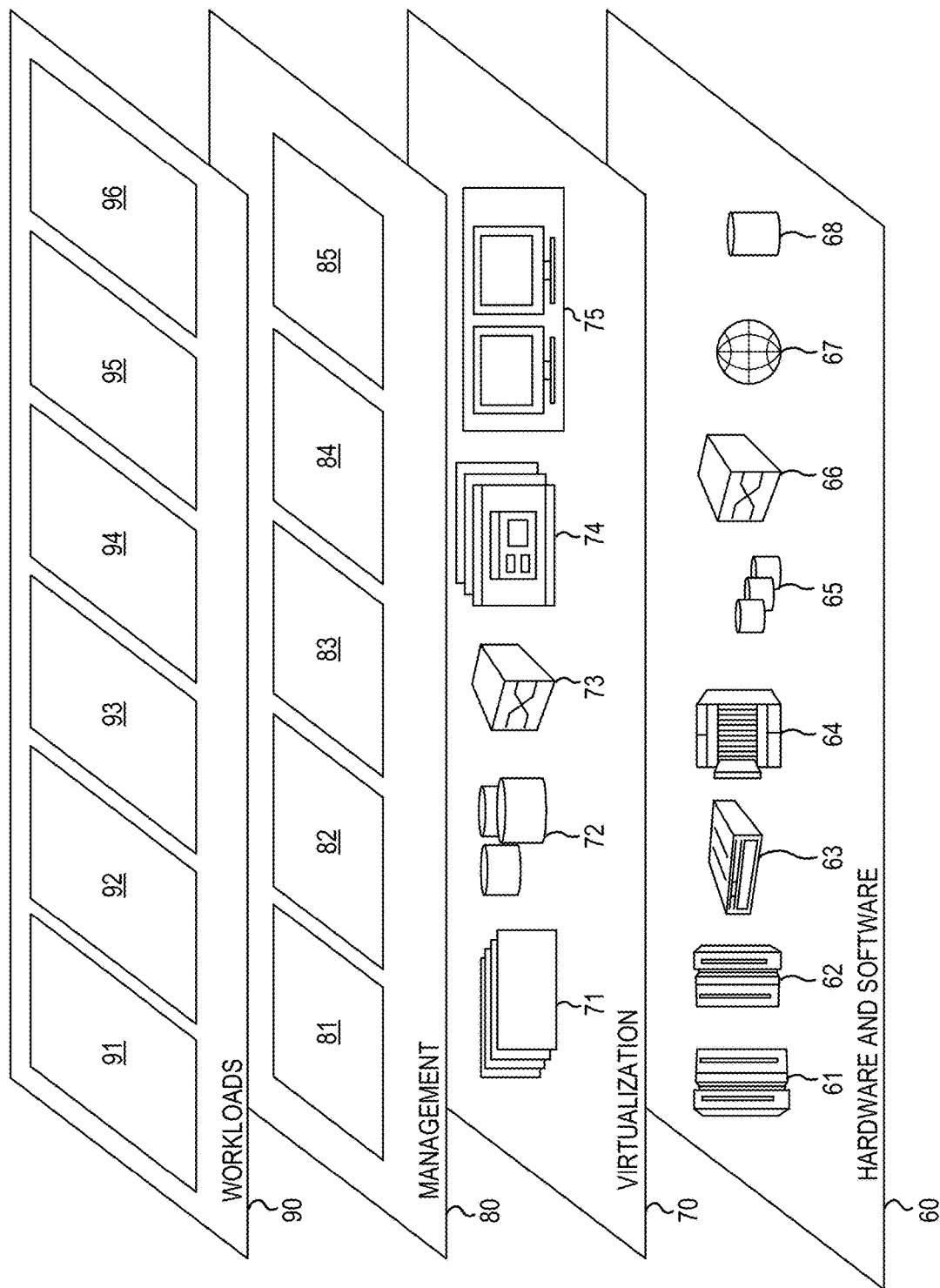
FIG. 3 shows a set of functional abstraction layers provided by a cloud computing environment, consistent with some embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GAN regeneration module 96.

Digital Capture Device

Figure 4:
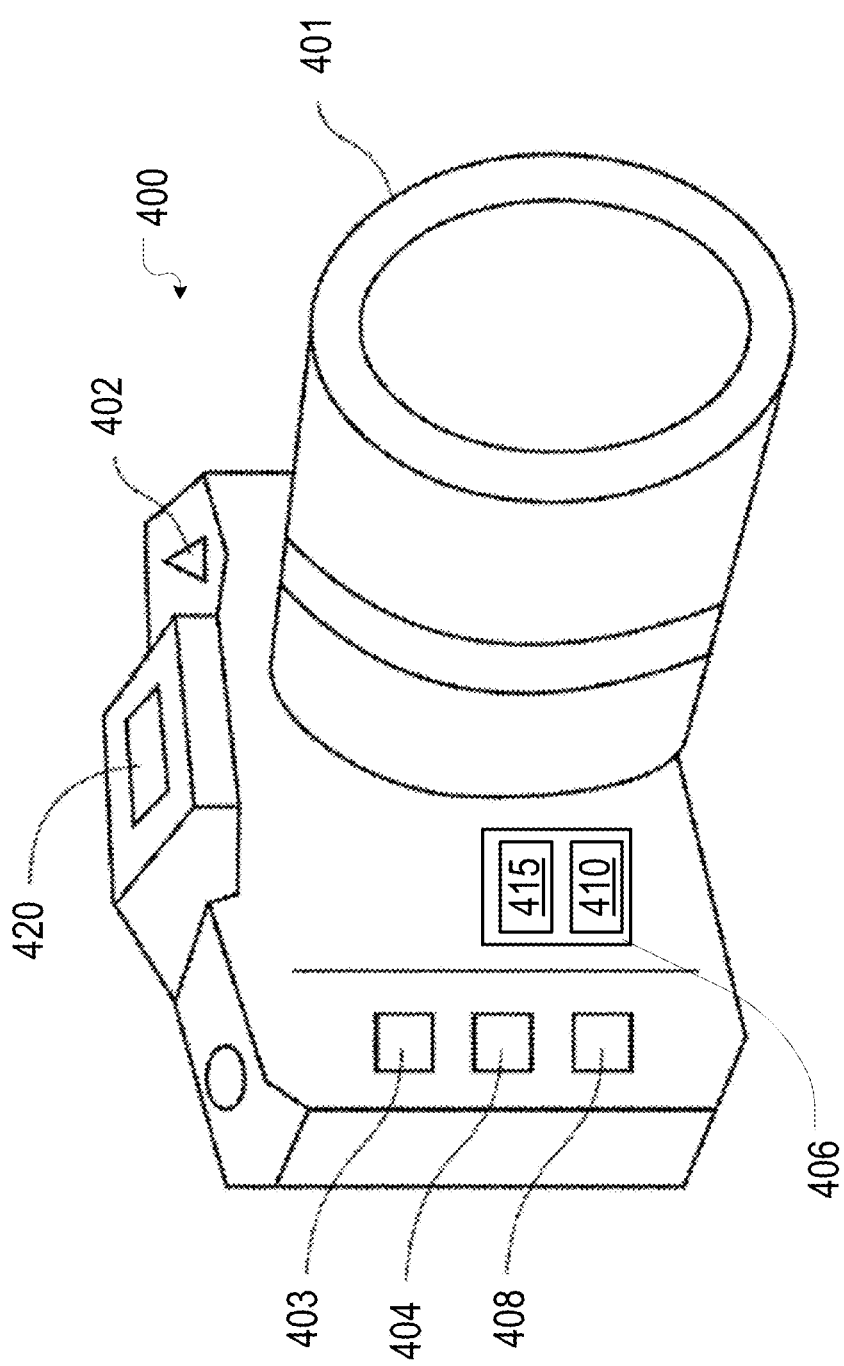
FIG. 4 is an isometric view of an image capture device, such as a digital camera, consistent with some embodiments.

FIG. 4 is an isometric view of an image capture device 400, such as a digital camera, consistent with some embodiments. This image capture device 400 may include a camera lens 401, an image sensor 402 (e.g., a charge coupled device), a microphone 403, a wireless network interface 404 configured to establish a network (e.g., Internet) connection with the digital media storage system of FIG. 2, a memory 406, and a processor 408. The memory 406, in turn, may store an artificial intelligence powered image capture program 410 and image data 415 associated with one or more captured images and/or videos. The processor 408 may execute the image capture program 410 in response to user input.

In operation, a user may direct the image capture device 400 to capture a particular scene containing a plurality of objects. The image capture program 410 may respond by causing the camera lens 401 to focus the scene onto the image sensor 402. Simultaneously, the image capture program 410 may cause the microphone 403 to capture sounds associated with the scene. The image sensor 402 and the microphone 403 may create electrical signal(s) representing the image, video, and/or sound. Next, as will be discussed in more detail below, the image compression program 412 generates an optimized capture plan to encode the signals into a digital media file. That digital media file, in turn, may be transmitted to the digital media storage system of FIG. 2 using the wireless network interface 404, may be stored in the memory 406, or both.

In some embodiments, the image capture device 400 may further include a user interface 420. The user interface 420 may include one or more interface screens, such as a touch screen for receiving input from the user and/or displaying image capture device information to a user. The user may interact with the user interface 420 to modify the camera's settings or to respond to a prompt by the image capture device 400. For example, the image capture device 400 may pose a query to the user regarding a desired level of quality, and the user's response may be used by the image capture device 400 when capturing images in the future, as discussed below in more detail.

Figure 5:
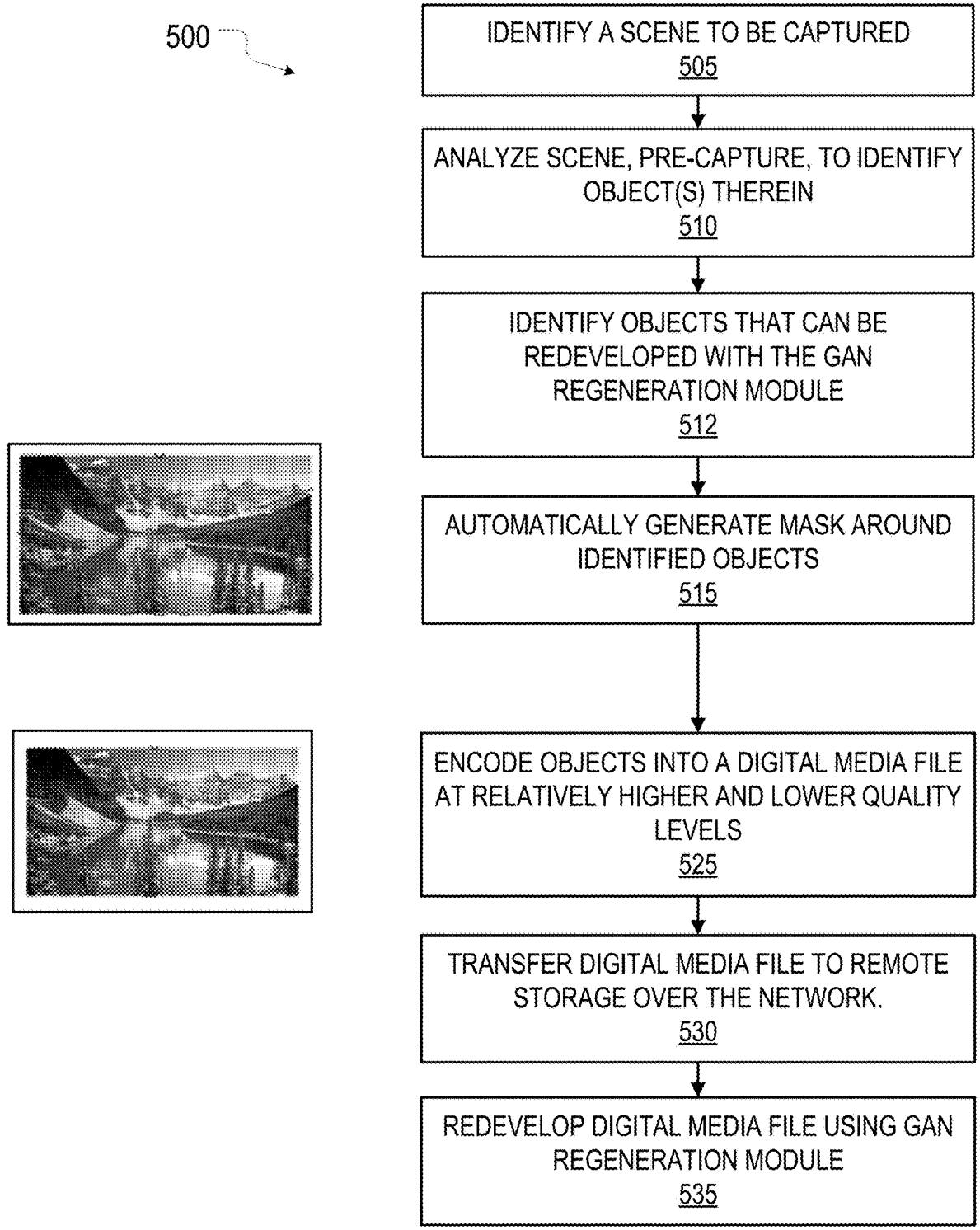
FIG. 5 is a flow chart illustrating one method of identifying what portions of the potential digital media file can and/or cannot be desirably redeveloped, and then dynamically generating an optimized capture plan to reduce a size of the resulting digital media file, consistent with some embodiments.

FIG. 5 is a flow chart illustrating one method 500 of identifying, by the digital capture device 400, which portions of the potential digital media file can and/or cannot be desirably redeveloped with the GAN regeneration module 96 of FIG. 3, and then dynamically generating an optimized capture plan to reduce a size of the resulting digital media file, consistent with some embodiments. At operation 505, the digital capture device 400 may identify a scene to be captured. This may include receiving input from a user/operator about an exact direction, angle, timing, shutter speed, etc., at which the digital capture device 400 should operate.

At operations 510-515, the digital capture device 400 generates a capture plan for the scene. This may include analyzing the scene, pre-capture, to identify a plurality of objects therein at operation 510, and then automatically determining which of those objects can be redeveloped with the GAN regeneration module 96 to a specified quality level and which of those objects cannot be desirably redeveloped with the GAN regeneration module 96 to a specified quality level at operation 512. Operation 510 may be performed using a first AI model trained to identify objects and operation 512 may be performed by a second AI model trained to predict GAN quality using the identified objects. Next, at operation 515, the digital capture device 400 may automatically generate a mask around the identified portion(s) that cannot be desirably redeveloped and, thus, should be captured at a highest quality level. Additionally or alternatively, the mask may also indicate which part(s) can be desirably redeveloped and, thus, may be captured at a lower quality level. If the digital capture device 400 is configured to collect video, operation 515 may include calculating an optimal a frame rate of at which the objects can be captured (or to which it may be reduced). In some embodiments, this may include determining a rate of movement and/or change of the object between frames. Objects that are largely stationary/unchanging may be captured at a relatively lower frame rate than objects that are moving/changing rapidly. This operation 515 may be performed using a third AI model trained to minimize file size subject to a constraint.

At operation 525, the digital capture device 400 may begin encoding the scene into a digital media file. This may include using the calculated mask to encode some identified objects at a relatively lower capture-quality level (e.g., specific object(s) that can be redeveloped later using the GAN regeneration module 96 to at least a specified quality level). This may also include using the mask to encode other portions of the scene at a highest available capture-quality level enabled by the image sensor 402 (e.g., specific object(s) that cannot be easily redeveloped later). In video applications, this may also involve encoding portions of the scene at a relatively higher or lower frame rate, again depending on whether or not those frames can be desirably redeveloped using the GAN regeneration module 96 to at least a specified quality level.

At operation 530, the resulting digital media file may be transferred to remote storage over the network. Additionally or alternatively, this operation 530 may include storing the digital information locally in memory 406. At operation 535, the GAN regeneration module 96 may be used to redevelop the digital media file toward the specified quality level. This redevelopment operation may begin immediately upon transfer of the digital media file, or may be deferred until a later time, depending on how the digital capture device 400 and the digital media storage system are configured and how quickly a user wants to consume the digital media.

Figure 6A:
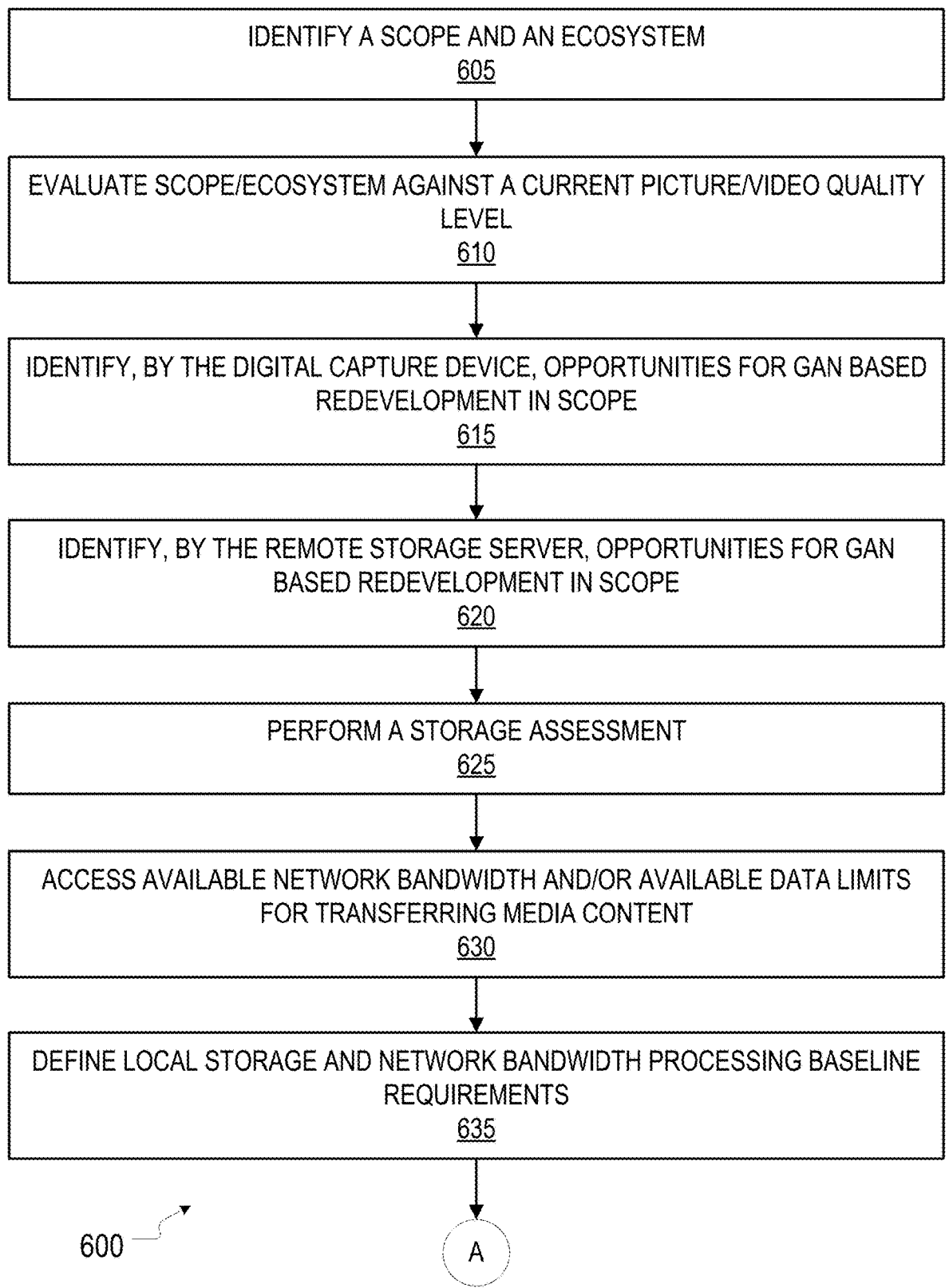
FIGS. 6A-6B are parts of a flow chart showing one method of performing the generation and masking operations, consistent with some embodiments.
Figure 6B:
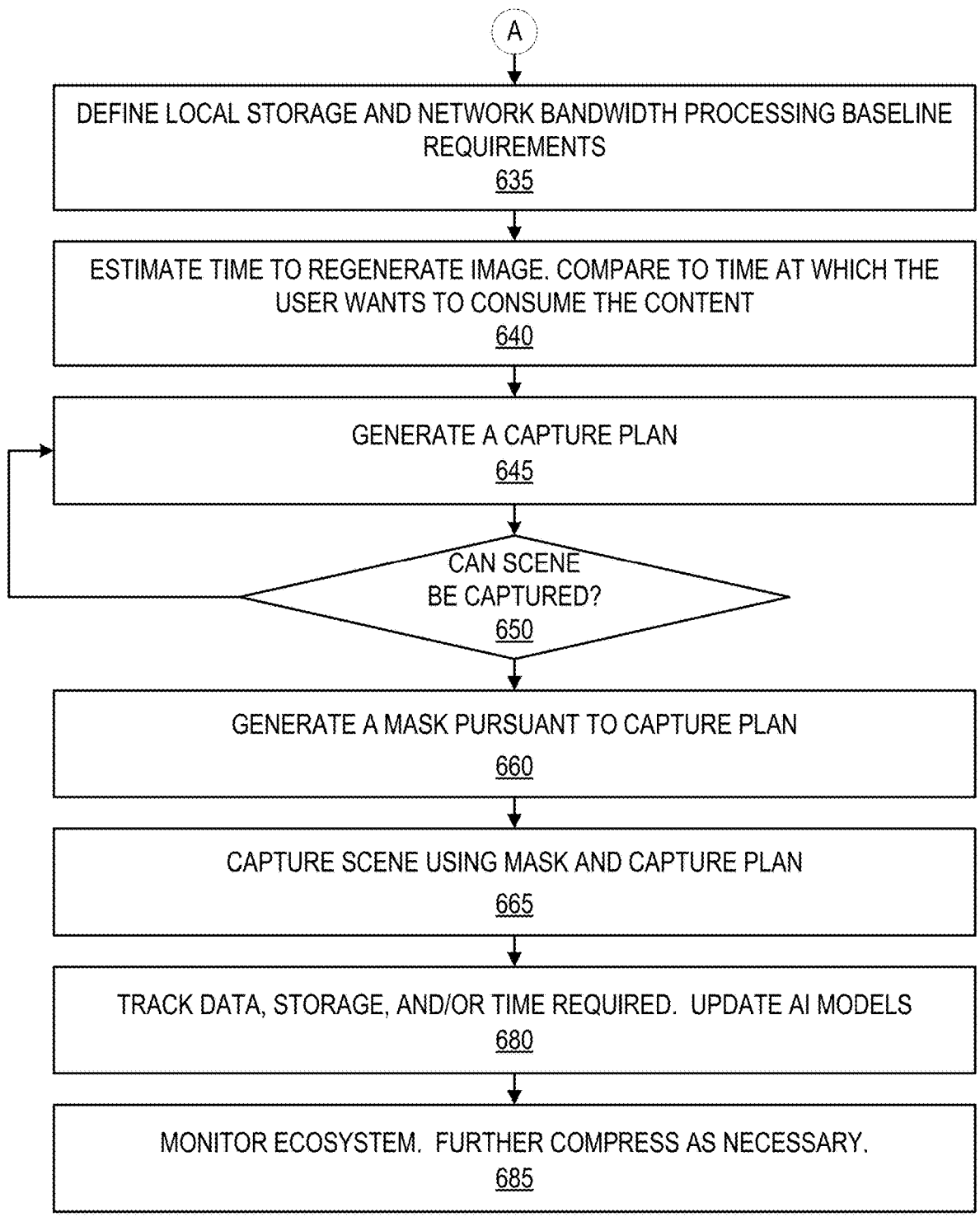

FIGS. 6A-6B are parts of a flow chart showing one method 600 of performing the generation and masking operations, consistent with some embodiments. At operation 605, the digital capture device 400 may initially identify a scope (e.g., a particular scene to be captured) and an ecosystem. The ecosystem may include identifying the specific GAN regeneration module 96 that will be used for redevelopment, as well as its specific parameters, if any. Next, the digital capture device 400 may evaluate the scope/ecosystem against a current picture/video quality level defined in the user interface 420 at operation 610. Based on the historical analysis of previous GAN enabled image redevelopment and/or correction and the current scope, an initial quality evaluation may be performed by the capture device 400. At operation 615, opportunities for GAN based redevelopment in the scope may be identified. This may include identifying which combination of opportunity parameter(s) and/or object(s) present in the image and/or video are favorable for GAN based redevelopment and which combination of opportunity parameter(s) and/or object(s) are unfavorable. These opportunity parameters, in turn, may include shadow, lighting condition, etc., that are to be considered for relatively higher quality GAN based redevelopments. In some embodiments, the remote storage server may additionally or alternatively perform a similar evaluation of which combinations are favorable and which are not favorable, and transmit the output of the analysis back to the digital capture device 400 at operation 620.

At operation 625, the digital capture device 400 may perform a storage assessment. This may include identifying the available local storage in which the captured images may be stored. This may also include identifying available remote storage where the captured data is to be stored. Next, the digital capture device 400 may assess the available network bandwidth and/or available data limits for transferring the media content at operation 630. This may include performing a network evaluation (e.g., ping command) to the identified remote storage provider.

The digital capture device 400 may use the information collected at operations 615-630 to define the local storage and network bandwidth processing baseline requirements (operation 635). This may include analyzing historical data (e.g., in the knowledge base) to identify how much local storage space may be required or how much network bandwidth may be required at various quality levels. The digital capture device 400 may then estimate how long it may take for the GAN regeneration module 96 to regenerate portion(s) of the image, and then compare that estimate to a time at which the user wants to consume the content or otherwise have it available for consumption, at operation 640. This operation 640 may include estimating a time necessary to transfer the resulting media to remote storage.

At operation 645, the digital capture device 400 may generate a capture plan. This may include defining a threshold image quality requirement below for GAN redevelopment (e.g., if the GAN regeneration module 96 will be unable to meet or exceed that threshold quality level for an object, then the digital capture device 400 will capture/encode that object at its highest quality). This may include identifying a desired quality of image by the user in the user interface 420 and an amount of storage space and/or bandwidth available. This information may be input into an AI model trained using the historical knowledge base. At operation 650, the digital capture device 400 may determine whether or not the scene can be captured using the defined threshold quality level. This may include determining whether or not there would be insufficient space and/or bandwidth for the resulting digital media file, and if not, generating an updated capture plan with a lower threshold quality level (i.e., more objects will be redeveloped by the GAN regeneration module 96). This may also include comparing the estimated amount of time required for GAN redevelopment to a desired time at which the user wishes to consume the resulting digital media (e.g., entered using the user interface 420). If the estimated time exceeds the desired time, then the digital capture device 400 may generate an updated capture plan with a higher threshold quality level (i.e., fewer objects will be redeveloped by the GAN regeneration module 96).

At operation 660, the digital capture device 400 generates a mask identifying which objects will be captured/encoded at the relatively high level and/or which objects will be captured/encoded at a relatively lower quality level and later redeveloped by GAN regeneration module 96 pursuant to the capture plan. If the digital capture device 400 is capturing video, then additionally or alternatively, the mask may identify objects to be captured at relatively higher or lower frame rates. This may include performing, by the AI model, frame optimization for video based processing, including the GAN regeneration module 96 providing information on how many frames can be redeveloped. At operation 665, the digital capture device 400 may capture the scene using the generated mask and capture plan.

At operation 680, the digital capture device 400 may track data usage, storage space, and/or time required for iterative processing. This may include keeping track of the memory 406 used, the time takes to generate the final image, and other relevant data. The digital capture device 400 may use this information to update the AI model(s) to better optimize the future image processing operations when similar conditions are met. At operation 685, the digital capture device 400 may continue to monitor the ecosystem to identify changes. For example, if the digital capture device 400 determines that the amount of local or remote storage is low (e.g., below a threshold value), then the digital capture device 400 may review the stored digital media files to identify stored images and/or videos having similar content (e.g., the same objects). If the same object is identified in different files and the user has space constraints in the memory 406, then the digital capture device 400 may suggest the user via the user interface 420 to reduce the quality of one of those instances.

Machine Learning

As previously discussed, generative machine learning models may be used to redevelop objects in images and/or videos. Generative adversarial networks (GANs) may utilize two neural networks referred to as a discriminator AI model and a generator AI model, respectively, which may operate in a minimax game to find the Nash equilibrium. That is, the generator AI model may seek to create as many realistic images as possible and the discriminator AI model may seek to distinguish between images that are real and generated (fake) images.

Figure 7A:
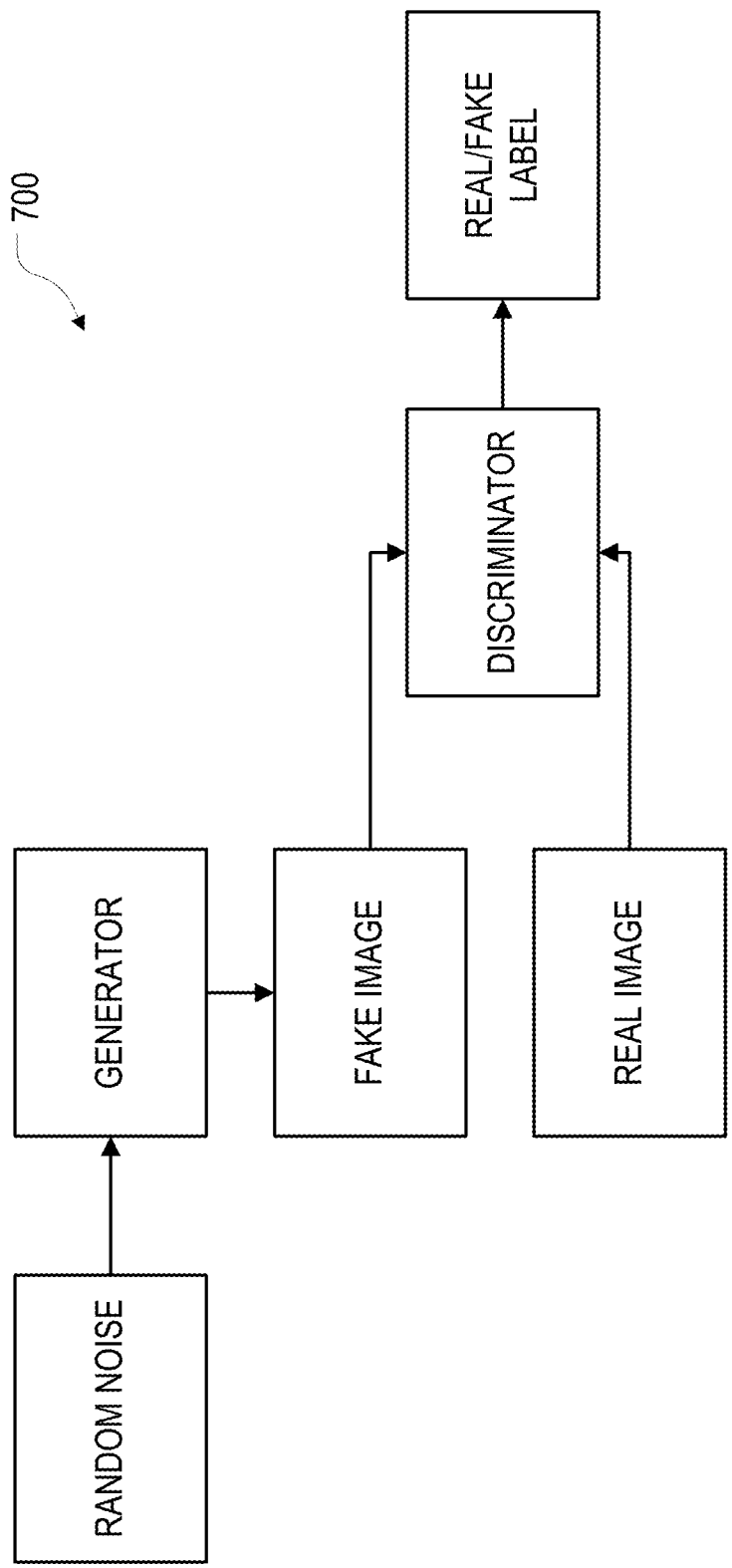
FIG. 7A is an example block diagram of a generative adversarial network (GAN), consistent with some embodiments.

FIG. 7A is an example block diagram 700 of a generative adversarial network (GAN), consistent with some embodiments. As shown in FIG. 7A, the generator AI model, G, may take a vector z, sampled from random Gaussian noise or conditioned with structured input, and may transform the noise to pG=G(z) to mimic the data distribution, pdata. Batches of the generated (fake) images and real images may be sent to the discriminator AI model, D, where the discriminator AI model may assign a label "0" for real or a label "1" for fake. The cost of the discriminator AI model, J(D), and generator AI model, J(G), may respectively be as follows:

$$J(D) = -\tfrac{1}{2} * (E_{x\text{-}pdata}[\log D(x)]) - \tfrac{1}{2} * (E_z[\log(1-D(G(z))]) \qquad (1)$$

$$J(G) = -\tfrac{1}{2} * E_z[\log D(G(z))] \qquad (2)$$

With an appropriate optimization technique, the neural networks of the generator G AI model and discriminator D AI model may be trained to reach an optimal point. The optimal generator AI model G may produce realistic images and the optimal discriminator AI model D may estimate the likelihood of a given image being real.

The generator AI model and the discriminator AI model in some embodiments may be any software system that recognizes patterns in data sets. In some embodiments, the AI models may comprise a plurality of artificial neurons interconnected through connection points called synapses. Each synapse may encode a strength of the connection between the output of one neuron and the input of another. The output of each neuron, in turn, is determined by the aggregate input received from other neurons that are connected to it, and thus by the outputs of these "upstream" connected neurons and the strength of the connections as determined by the synaptic weights.

Figure 7B:
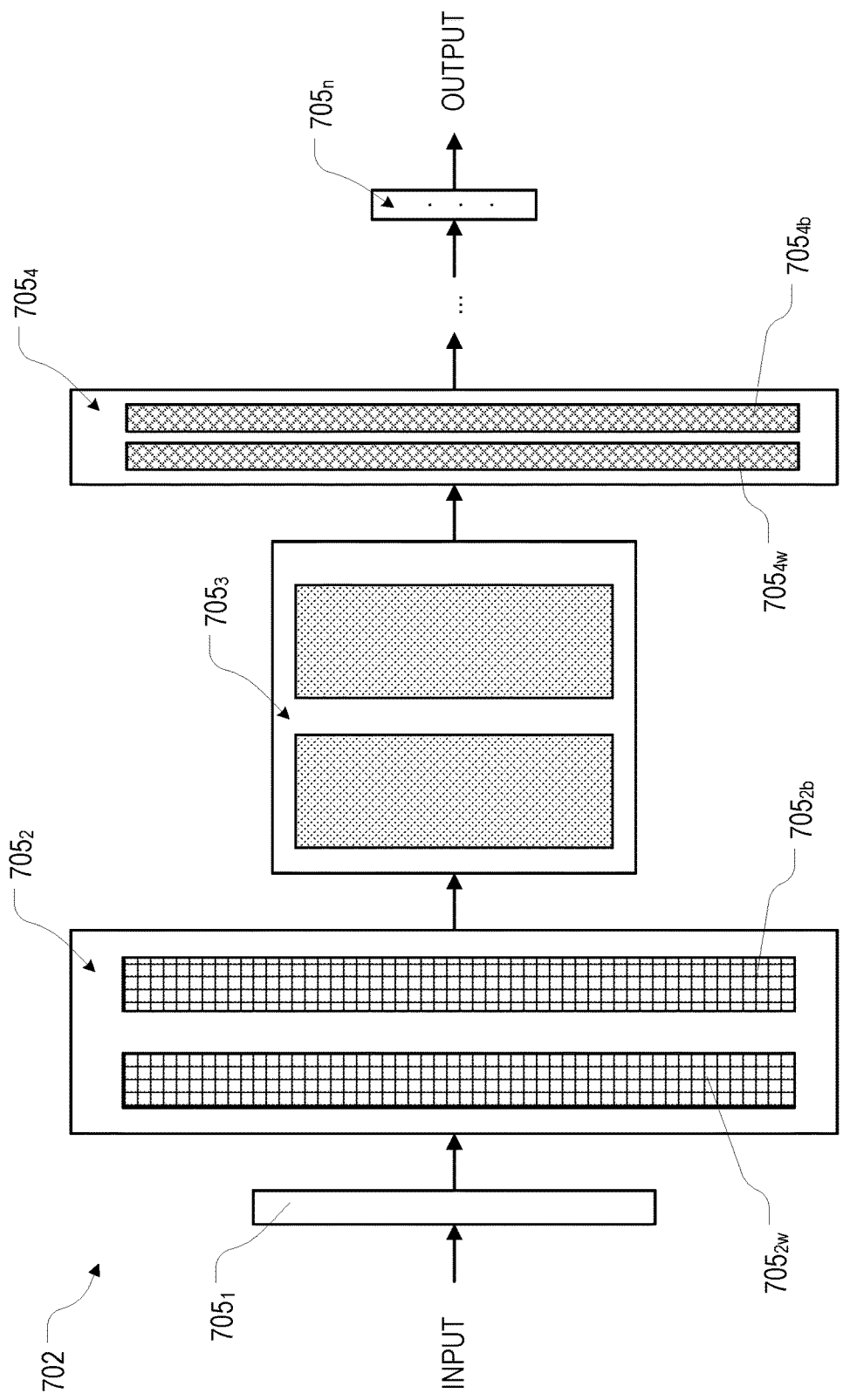
FIG. 7B illustrates an example AI model, consistent with some embodiments.

The AI models may be trained to solve a specific problem (e.g., discrimination between real and fake images) by adjusting the weights of the synapses such that a particular class of inputs produce a desired output. This weight adjustment procedure in these embodiments is known as "learning." Ideally, these adjustments lead to a pattern of synaptic weights that, during the learning process, converge toward an optimal solution for the given problem based on some cost function. In some embodiments, the artificial neurons may be organized into layers. FIG. 7B illustrates an example AI model 702, consistent with some embodiments. The AI model 702 in FIG. 7B comprises a plurality of layers $705_1$-$705_n$. Each of the layers comprises weights $705_{1w}$-$705_{nw}$ and biases $705_{1b}$-$705_{nb}$ (only some labeled for clarity). The layer $705_1$ that receives external data is the input layer. The layer $705_n$ that produces the ultimate result is the output layer. Some embodiments include a plurality of hidden layers $705_2$-$705_{n-1}$ between the input and output layers, and commonly hundreds of such hidden layers. Some of the hidden layers $705_2$-$705_{n-1}$ may have different sizes, organizations, and purposes than others of the hidden layers $705_2$-$705_{n-1}$. For example, some of the hidden layers in the AI model may be convolution layers, while other hidden layers may be fully connected layers, deconvolution layers, or recurrent layers.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a subsystem, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

GENERAL

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Therefore, it is desired that the embodiments described herein be considered in all respects as illustrative, not restrictive, and that reference be made to the appended claims for determining the scope of the invention.

What is claimed is:

1. A method for reducing a size of media content, comprising:
    identifying a scene to be captured by a capture device, wherein the scene comprises a plurality of objects;
    determining whether at least one of:
        (i) an available storage in the capture device to store a digital media file associated with the scene; and
        (ii) an available network bandwidth to transfer the digital media file;
    is below an associated threshold, and in response to the threshold determination:
        analyzing the plurality of objects to determine which objects can be redeveloped by a GAN regeneration module to a threshold quality level and which objects cannot be redeveloped with the GAN regeneration module to the threshold quality level;
        generating an optimized capture plan based on the analyzing; and
        encoding the scene pursuant to the optimized capture plan to produce the digital media file.

2. The method of claim 1, further comprising redeveloping the digital media file to a higher quality level by the GAN regeneration module.

3. The method of claim 2, further comprising:
    calculating an estimated time to redevelop the digital media file to the higher quality level by the GAN regeneration module; and
    if the estimated time is greater than a threshold, increasing the threshold quality level.

4. The method of claim 1, wherein encoding the scene comprises:
    capturing the objects that can be redeveloped by the GAN regeneration module at a lower resolution than the objects that cannot be redeveloped.

5. The method of claim 1, wherein encoding the scene comprises:
    capturing the objects that can be redeveloped at a lower frame rate than the objects that cannot be redeveloped.

6. The method of claim 1, wherein the generating of the optimized capture plan comprises using a historical quality evaluation of GAN enabled image redevelopments to determine which objects can be redeveloped to the threshold quality level.

7. The method of claim 1, further comprising, in response to determining that an amount of local storage on the capture device is below a threshold:
    analyzing a plurality of existing stored digital media files in a storage system;
    analyzing a plurality of objects in the existing stored digital media files to identify which objects in the stored digital media files can be redeveloped by the GAN regeneration module to the threshold quality level and which objects in the stored digital media files cannot be redeveloped with the GAN regeneration module to the threshold quality level; and
    reducing a quality level of the objects that can be redeveloped by the GAN regeneration module.

8. A system for reducing a size of media content, the system comprising:
    one or more processors; and
    a memory communicatively coupled to the one or more processors;
    wherein the memory comprises instructions which, when executed by the one or more processors, cause the one or more processors to perform a method comprising:
        identifying a scene to be captured by a capture device, wherein the scene comprises a plurality of objects;
        determining whether at least one of:
            (i) an available storage in the capture device to store a digital media file associated with the scene; and
            (ii) an available network bandwidth to transfer the digital media file;
        is below an associated threshold, and in response to the threshold determination:
            analyzing the plurality of objects to determine which objects can be redeveloped by a GAN regeneration module to a threshold quality level and which objects cannot be redeveloped with the GAN regeneration module to the threshold quality level;
            generating an optimized capture plan based on the analyzing; and
            encoding the scene pursuant to the optimized capture plan to produce the digital media file.

9. The system of claim 8, wherein the method further comprises redeveloping the digital media file to a higher quality level by the GAN regeneration module.

10. The system of claim 9, wherein the method further comprises:
    calculating an estimated time to redevelop the digital media file to the higher quality level by the GAN regeneration module; and
    if the estimated time is greater than a threshold, increasing the threshold quality level.

11. The system of claim 8, wherein encoding the scene comprises:
    capturing the objects that can be redeveloped by the GAN regeneration module at a lower resolution than the objects that cannot be redeveloped.

12. The system of claim 8, wherein encoding the scene comprises:
    capturing the objects that can be redeveloped at a lower frame rate than the objects that cannot be redeveloped.

13. The system of claim 8, wherein the generating of the optimized capture plan comprises using a historical quality evaluation of GAN enabled image redevelopments to determine which objects can be redeveloped to the threshold quality level.

14. The system of claim 8, wherein the method further comprises, in response to determining that an amount of local storage on the capture device is below a threshold:
    analyzing a plurality of existing stored digital media files in a storage system;
    analyzing a plurality of objects in the existing stored digital media files to identify which objects in the stored digital media files can be redeveloped by the GAN regeneration module to the threshold quality level and which objects in the stored digital media files cannot be redeveloped with the GAN regeneration module to the threshold quality level; and reducing a quality level of the objects that can be redeveloped by the GAN regeneration module.

15. A computer program product for reducing a size of media content, the computer program product comprising a computer readable storage medium having program instructions embodied therewith, the program instructions executable by a computer to perform a method comprising:

identifying a scene to be captured by a capture device, wherein the scene comprises a plurality of objects;

determining whether at least one of:
  (i) an available storage in the capture device to store a digital media file associated with the scene; and
  (ii) an available network bandwidth to transfer the digital media file;
is below an associated threshold, and in response to the threshold determination:
  analyzing the plurality of objects to determine which objects can be redeveloped by a GAN regeneration module to a threshold quality level and which objects cannot be redeveloped with the GAN regeneration module to the threshold quality level;
  generating an optimized capture plan based on the analyzing; and
  encoding the scene pursuant to the optimized capture plan to produce the digital media file.

16. The computer program product of claim 15, wherein encoding the scene comprises:
  capturing the objects that can be redeveloped by the GAN regeneration module at a lower resolution than the objects that cannot be redeveloped.

17. The computer program product of claim 15, wherein encoding the scene comprises:
  capturing the objects that can be redeveloped at a lower frame rate than the objects that cannot be redeveloped.

18. The computer program product of claim 15, wherein the generating of the optimized capture plan comprises using a historical quality evaluation of GAN enabled image redevelopments to determine which objects can be redeveloped to the threshold quality level.

19. The computer program product of claim 15, wherein the method further comprises:
  redeveloping the digital media file to a higher quality level by the GAN regeneration module;
  calculating an estimated time to redevelop the digital media file to the higher quality level by the GAN regeneration module; and
  if the estimated time is greater than a threshold, increasing the threshold quality level.

20. The computer program product of claim 15, wherein the method further comprises, in response to determining that an amount of local storage on the capture device is below a threshold:
  analyzing a plurality of existing stored digital media files in a storage system;
  analyzing a plurality of objects in the existing stored digital media files to identify which objects in the stored digital media files can be redeveloped by the GAN regeneration module to the threshold quality level and which objects in the stored digital media files cannot be redeveloped with the GAN regeneration module to the threshold quality level; and
  reducing a quality level of the objects that can be redeveloped by the GAN regeneration module.

* * * * *